(12) United States Patent
Pienmäki et al.

(10) Patent No.: US 7,039,388 B2
(45) Date of Patent: May 2, 2006

(54) METHOD FOR PROVIDING A COLLECT CALL SERVICE IN A MOBILE COMMUNICATION SYSTEM

(75) Inventors: Sami Pienmäki, Tampere (FI); Ilkk Tiilikainen, Tampere (FI)

(73) Assignee: Nokia Corporation, Espoo (FI)

( * ) Notice: Subject to any disclaimer, the term of this patent is extended or adjusted under 35 U.S.C. 154(b) by 126 days.

(21) Appl. No.: 10/380,826

(22) PCT Filed: Sep. 17, 2001

(86) PCT No.: PCT/FI01/00803

§ 371 (c)(1),
(2), (4) Date: Oct. 3, 2003

(87) PCT Pub. No.: WO02/25923

PCT Pub. Date: Mar. 28, 2002

(65) Prior Publication Data

US 2004/0058667 A1 Mar. 25, 2004

(30) Foreign Application Priority Data

Sep. 19, 2000 (FI) .................................. 20002064

(51) Int. Cl.
*H04M 11/00* (2006.01)
(52) U.S. Cl. .................................................. 455/405
(58) Field of Classification Search ................ 455/406, 455/405; 379/44.02, 211.02, 88.11
See application file for complete search history.

(56) References Cited

U.S. PATENT DOCUMENTS

| 5,473,671 A | 12/1995 | Partridge, III |
| 5,937,043 A | 8/1999 | He |
| 2004/0058667 A1 * | 3/2004 | Pienmaki et al. ........... 455/405 |

FOREIGN PATENT DOCUMENTS

WO    WO 99/16265    4/1999

OTHER PUBLICATIONS

Patent Abstracts of Japan, 62-147854 A, Jul. 1, 1987.
"An Object-Based Architecture for WAP-Compliant Applications", Cannataro et al, Database and Expert Systems Applications, 2000. Proceedings. 11th International Workshop on Sep. 4-8, 2000. Pags 178-185.

* cited by examiner

*Primary Examiner*—William D. Cumming
(74) *Attorney, Agent, or Firm*—Squire, Sanders & Dempsey L.L.P.

(57) ABSTRACT

A method of processing a communication in a communications system includes setting up a communication between subscriber A and subscriber B. The method includes receiving a communication initiation from subscriber A, transmitting, in response to the communication initiation, an enquiry about whether subscriber B is willing to pay for a communication from said subscriber A by means of network elements of the communications system, and if subscriber B is willing to pay for the communication according to the enquiry, connecting a communication between subscriber A and subscriber B automatically by the network elements of the communications system so that subscriber B is defined as the payer of the communication.

8 Claims, 3 Drawing Sheets

METHOD FOR PROVIDING A COLLECT CALL SERVICE IN A MOBILE COMMUNICATION SYSTEM

BACKGROUND OF THE INVENTION

The invention relates to communications systems and particularly to charging in them.

Prior art mobile communication systems, such as the GSM system (Global System for Mobile Communication), generally employ a charging system in which the calling party normally pays for the calls made. As the amount of traffic increases in mobile communication networks, subscribers hope for a more flexible charging system and the opportunity of influencing the billing. In a prior art solution for fixed telephone networks the called party pays for a call made, which is called a collect call. Collect calls are implemented as follows: the calling party makes a call to the operator's exchange and asks the person on duty to call to the called party to ensure that this party is willing to pay for the call. A call is not connected between the calling party and the called party until the operator has received acceptance from the called party. Then the called party is defined as the party to be charged.

The problem related to the arrangement described above is that the manual method is slow and requires personnel.

BRIEF DESCRIPTION OF THE INVENTION

An object of the invention is to provide a method and an apparatus implementing the method to solve the above-mentioned problems. The object of the invention is achieved with a method and an arrangement which are characterized by what is disclosed in the independent claims.

The term 'communication' refers to any kind of communication that can be set up between subscribers A and B through a communication system, such as a speech call or a data call. In the examples described below the invention is used for speech calls. However, the aim is not to restrict the invention to these embodiments.

In this application the term 'communication initiation' refers to signalling from subscriber A for making a collect call, but the actual call is not set up as a result of the signalling; it is only enquired whether subscriber B is willing to pay for the call. If the information on whether subscriber B is willing to pay for a call coming from subscriber A is stored in a database, the communication initiation consists of subscriber A's normal call set-up request. If the collect call is set up by first transmitting an enquiry from subscriber A to subscriber B about whether subscriber B is willing to pay for the call to be set up, this enquiry transmitted from subscriber A constitutes the communication initiation.

The invention is based on the idea that a communications system transmits, without manual actions by the operator, the enquiries needed to check whether the called party wants to pay for a communication from a certain number or not. If the called party is willing to pay for the communication, a communication is set up automatically between the parties and the called party is defined as the payer of the communication. If the called party does not want to pay for the communication, communication set-up can be discontinued or the communication set up so that the calling party pays for it.

An advantage of the method and system of the invention is that no operator or other person is needed for setting up the communication, but the messages related to the call to be set up are transmitted directly between subscriber terminals and network elements.

In a first preferred embodiment of the method according to the invention subscriber B defines in advance a group of subscribers the calls from whom subscriber B wants to pay for. Identifiers describing the group of subscribers defined, such as the subscriber numbers of these subscribers, are stored in a database and it is checked in response to receiving a call set-up request whether subscriber A in question belongs to the defined group of subscribers. If subscriber A in question belongs to the defined group of subscribers, an enquiry is transmitted to subscriber B's mobile station to ask whether subscriber B accepts a collect call coming from this subscriber A. If subscriber B accepts the call, the call is connected between subscriber A and subscriber B and subscriber B is defined as the payer of the call. This solution provides the advantage that in the case of some subscribers A a collect call is connected automatically. Thus subscriber B only needs to accept a collect call as a call arrives e.g. by pressing one button. This solution could be used when the parents of a family, for example, are willing to pay for all calls from their children.

In a second preferred embodiment of the method according to the invention an enquiry about whether subscriber B is willing to pay for a call to be set up between subscriber A and subscriber B is transmitted from subscriber A to subscriber B, the enquiry including an identifier which describes subscriber A. If subscriber B is willing to pay for the call, the call is connected between subscriber A and subscriber B and subscriber B is defined as the payer of the call. Thus subscriber B decides on a call-to-call basis whether he is willing to pay for the call in question or not.

The preferred embodiments of the invention are disclosed in the dependent claims.

BRIEF DESCRIPTION OF THE DRAWINGS

The invention will be described in greater detail by means of preferred embodiments with reference to the accompanying drawings, in which.

DETAILED DESCRIPTION OF THE INVENTION

Figure 1:
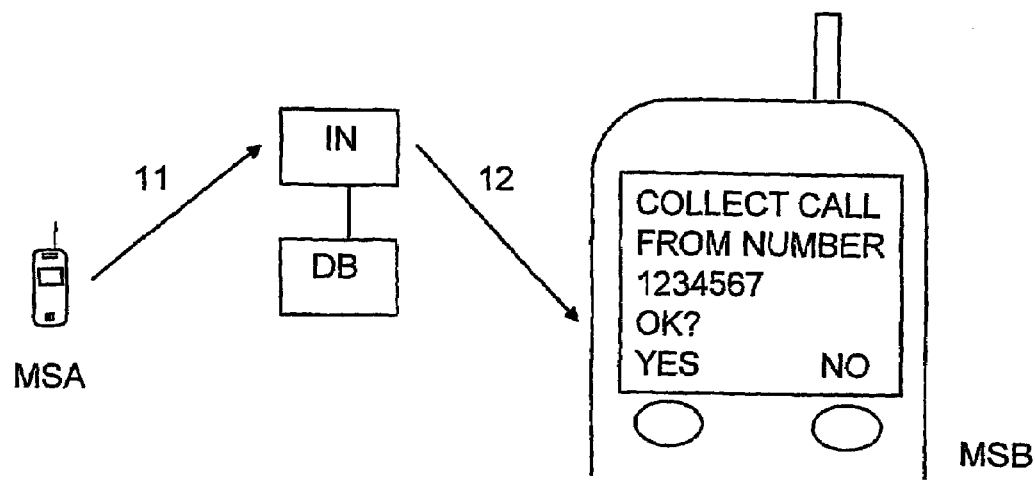
FIG. 1 is a block diagram of a first embodiment of the system according to the invention.

FIG. 1 is a block diagram of an embodiment of the system according to the invention. The figure shows only the elements that are essential for understanding the invention. The system shown comprises subscriber terminal A MSA, intelligent network part IN of subscriber B and a database DB connected to it for data transmission, and subscriber terminal B MSB. In the system illustrated at least subscriber terminal B MSB is a mobile station provided with WAP properties (Wireless Application Protocol). The embodiment of the system according to the invention illustrated in FIG. 1 is based on the idea that a set of subscriber numbers the calls from which subscriber B is willing to pay for are defined in advance and stored in the database DB. The set of numbers can be defined by subscriber terminal B MSB using the WAP technology or by a www server (World Wide Web). The idea is, however, that subscriber B can at any time add subscriber numbers to the database DB or delete numbers from it. In situation 11 shown in FIG. 1 subscriber terminal A MSA requests a call to subscriber B's number. In that case the intelligent network part IN of subscriber B recognizes that the reverse charging service of the intelligent network is connected for the called party MSB and compares subscriber A's number with the subscriber numbers stored in the database DB. If it is found out that subscriber A's number is among the stored subscriber numbers, a message about an incoming collect call is transmitted to subscriber terminal B MSB in step 12 using the WAP Push technology. For this to succeed, the system comprises a WAP gateway and a WTA server (Wireless Telephony Application) which the intelligent network part IN employs for communicating with the mobile station MSB. Having received the message about an incoming call, subscriber B can either accept or reject the collect call. If subscriber B accepts the collect call, subscriber A can be informed that subscriber B will pay for the call in question. The principle is that subscriber A always knows which party pays for the call. Depending on the terminal of subscriber A, this message can by transmitted e.g using the WAP Push technology, as a short message or as a voice announcement. If subscriber A's number is not found among the numbers stored in the database DB, a collect call is not set up. A call can, however, be set up in the normal manner, in which case subscriber A pays for the call.

Figure 5:
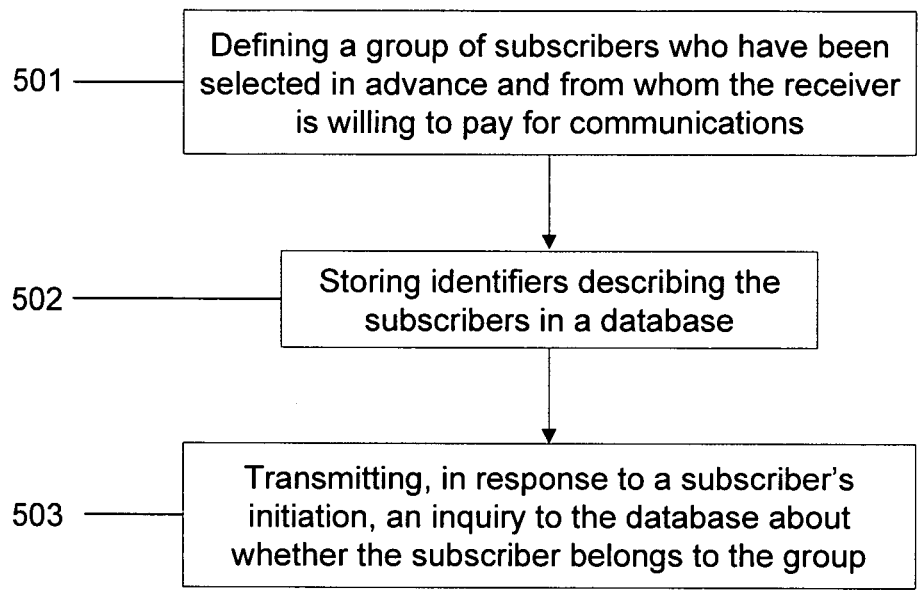
FIG. 5 illustrates a process of defining and using a group of subscribers, according to the invention.

FIG. 5 illustrates the process of defining and using a listing of users in the database DB for which a collect call will be accepted from. In step 501, a group of subscribers have been selected in advance as subscribers for whom subscriber B is willing to pay for. That group, in step 502, is stored in the database through the use of indentifiers. Thereafter, in step 503, after an initiation by subscriber A, a request is transmitted to the database to determine whether subscriber A belongs to the group of subscribers. As discussed above, this method may be used, of the set up in the normal manner may occur.

If subscriber A has a prepaid account, he may call to all subscribers who have the reverse charging service in use even though the prepaid account were empty because subscriber B pays for the whole call after he has agreed to receive the collect call.

The reverse charging service can also be implemented differently from the example described above, i.e. an enquiry about whether he will pay for the call is transmitted to subscriber B with each incoming call. In that case the intelligent network notes that subscriber B is a subscriber who has subscribed to the reverse charging service, but it is not decided on the basis of subscriber A's number whether the call is a collect call or a normal call paid for by subscriber A. It is also possible to connect the two service described above so that subscriber B always pays for all calls coming from the numbers stored in the database, and in the case of all other subscriber numbers subscriber B is given the opportunity to pay for the calls.

Even though in the example described above the subscriber number was used as the identifier of subscriber A in the database, another subscriber identifier, such as an IP address (Internet Protocol), can also be used in the solution according to the invention.

Figure 2:
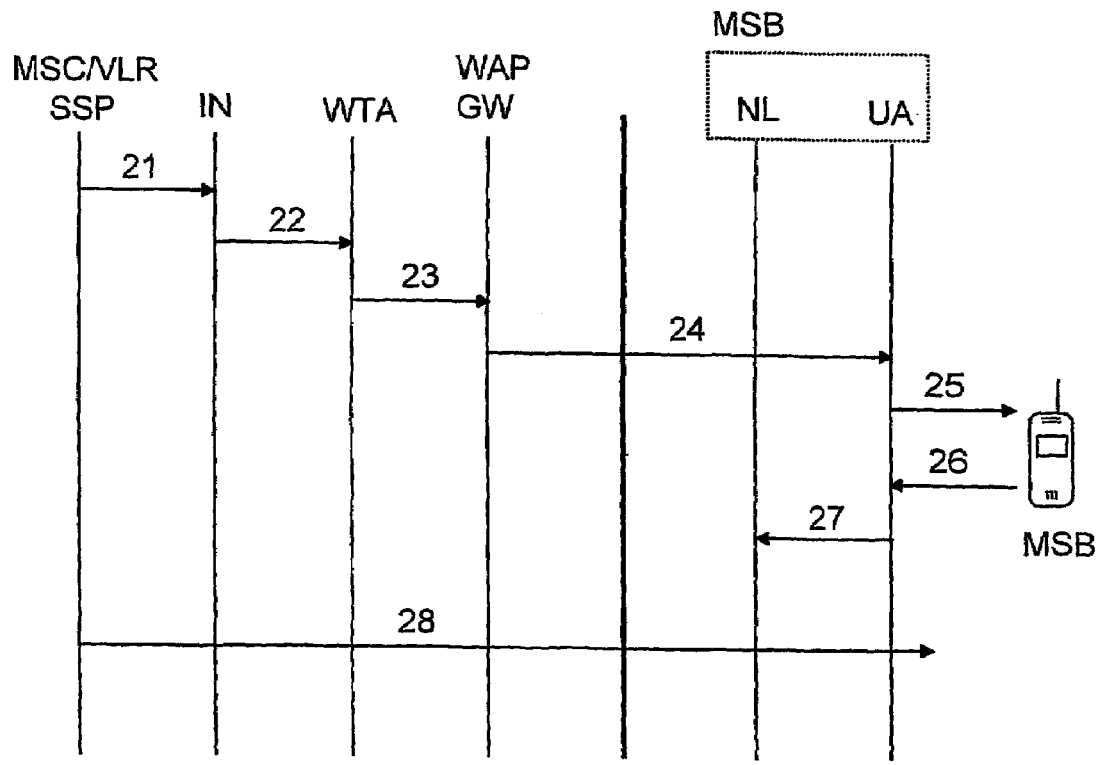
FIG. 2 is a signalling chart of a first embodiment of the method according to the invention.

FIG. 2 is a signalling chart of the first embodiment of the method according to the invention. In the figure a call first arrives at the mobile services switching centre MSC of subscriber B, in which case the visitor location register VLR is used for recognizing that subscriber B has a reverse charging service in use. In that cased the reverse charging service is connected by a service switching point SSP. In step 21 a triggering message is sent to the intelligent network IN to implement the service. The intelligent network IN recognizes that the service concerned is a WTA service and defines subscriber B as the party to be charged. In step 22 the intelligent network part IN asks the WTA server to send a message about an incoming collect call coming to subscriber B. In step 23 the message is forwarded to the WAP gateway, from which the message is transmitted to subscriber B in step 24. The message arrives at a user agent UA of subscriber B, which is the element that communicates with the WAP gateway. In step 25 a message in which subscriber B is asked whether he accepts an incoming collect call is shown on the display of subscriber B's mobile station. In step 26 subscriber B accepts the collect call from subscriber A. In step 27 the network layer NL of subscriber terminal B is informed that it should wait for a call from subscriber A's number. In that case subscriber B's mobile station answers a call coming from subscriber A automatically and does not react to other calls. In step 28 a speech channel is connected between subscriber A and subscriber B.

Figure 3:
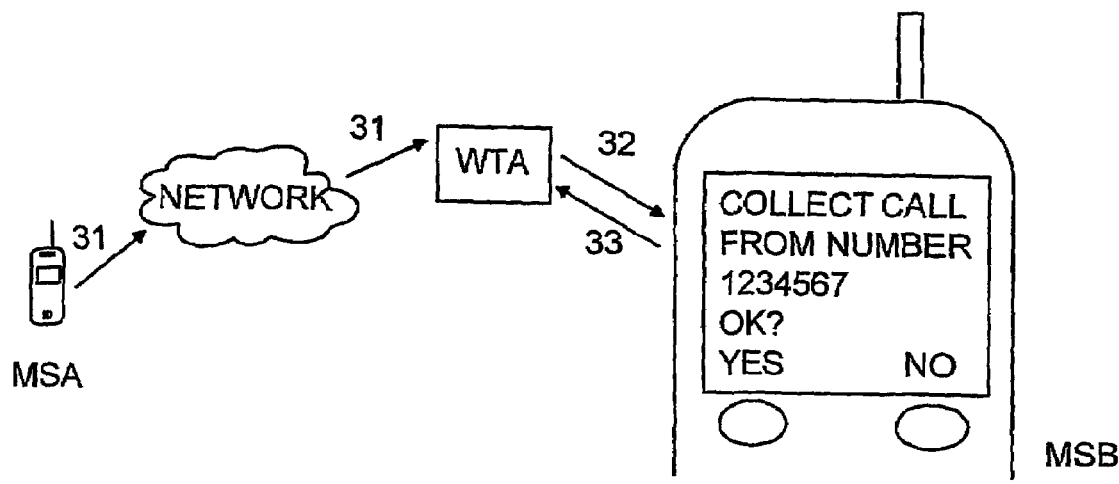
FIG. 3 is a block diagram of a second embodiment of the system according to the invention.

FIG. 3 is a block diagram of the second embodiment of the system according to the invention. The figure shows only the elements that are essential for understanding the invention. The system shown comprises subscriber terminal A MSA, network, WTA server WTA and subscriber terminal B MSB. In the system illustrated both subscriber terminal A MSA and subscriber terminal B MSB are mobile stations provided with WAP properties. In this system there are also WAP gateways (not shown) between the mobile stations MSA, MSB and the WTA server, the gateways being used for transmitting messages according to the WAP technology. The embodiment of the system according to the invention illustrated in FIG. 2 is based on the idea that in step 31 subscriber A sends a request related to a collect call and intended for subscriber B from his WAP phone to the WTA server via the network. From the WTA server the message is forwarded to subscriber B in step 32 using the WAP Push technology. In that case an enquiry about whether subscriber B is willing to pay for a call to be set up between subscriber A and subscriber B or not appears on the display of subscriber B's mobile station. In step 33 subscriber B responds to the enquiry. If subscriber B accepts the set-up of a collect call, the collect call is connected between subscriber A and subscriber B. A WAP Push message saying that subscriber B will pay for the call can also be transmitted to subscriber A. If subscriber B refuses to pay for the call, the call can be connected, but subscriber A will pay for it. In this case a message can also be transmitted to subscriber A. The principle is that subscriber A always knows which party pays for the call.

If subscriber A has a prepaid account, he can also in this case ask for a reverse charging service from all subscribers even though the prepaid account were empty, because subscriber B pays for the whole call after he has agreed to receive the collect call.

Figure 4:
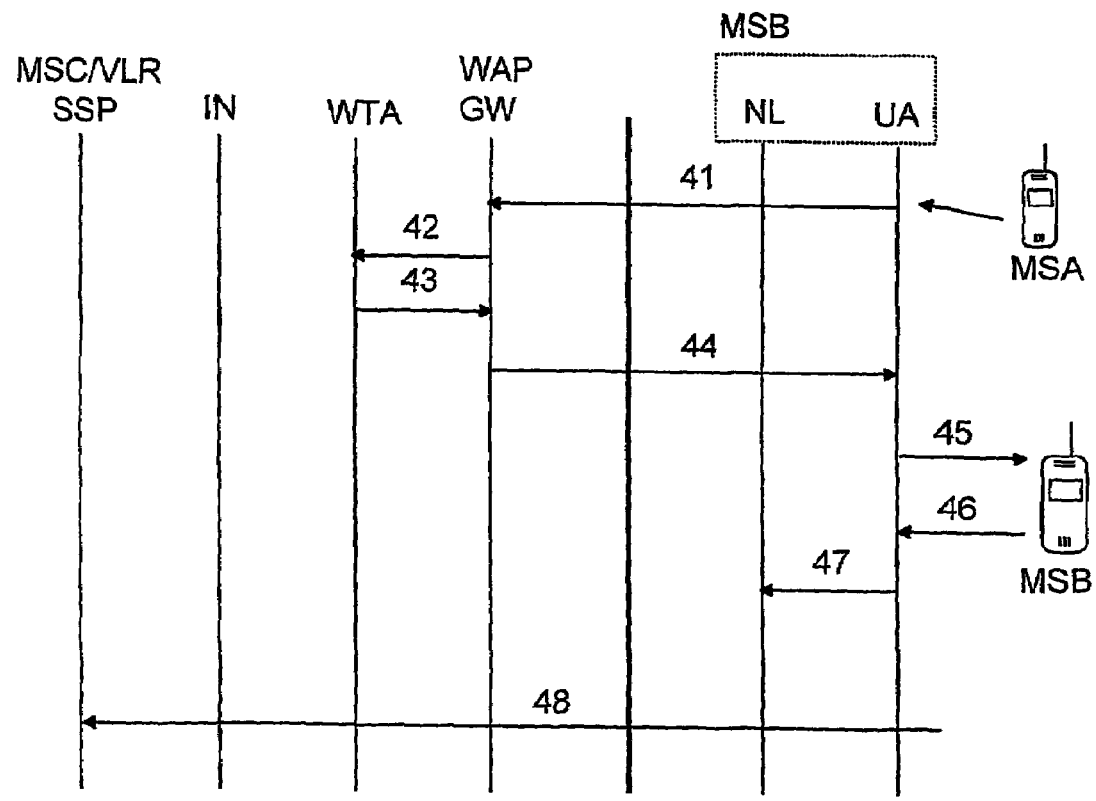
FIG. 4 is a signalling chart of a second embodiment of the method according to the invention.

FIG. 4 is a signalling chart of the second embodiment of the method according to the invention. In the figure subscriber A initiates the set-up of a collect call by making a collect call request with his WAP mobile station MSA. The WML (Wireless Markup Language) deck needed for this is stored in a subscriber-specific memory. When subscriber A wants to make a collect call, he keys in e.g. subscriber B's MSISDN number (Mobile Subscriber International ISDN number) in the place of the collect call request in the WAP menu of his mobile station. In step 41 a Get URL message (Uniform Resource Locator) is transmitted from the user agent of subscriber A's mobile station MSA to the WAP gateway. In step 42 the message is forwarded to the WTA server. Next, the WTA server of subscriber A generates the content of a message to be transmitted to subscriber B. Subscriber B's MSISDN number is obtained from the URL message and subscriber A's MSISDN number is added to the content of the message to be transmitted to subscriber B. In step 43 the WTA server transmits the message to the WAP gateway, which in step 44 forwards information on a collect call request to subscriber B's user agent as a WAP Push message. In step 45 a message saying that subscriber A requests reverse charging service from subscriber B is shown on the display of subscriber B's mobile station. In step 46 subscriber B responds that he accepts the collect call requested by subscriber A. In step 47 subscriber B's response is transmitted to the network layer of the mobile station. In step 48 the set-up of the collect call is initiated in the direction of subscriber B.

In the examples described above the invention was implemented in a GSM network. However, the aim is not to restrict the invention to these embodiments. The present invention can also be implemented in a third generation (3G) mobile system, such as UMTS (Universal Mobile Telecommunications System), or in an IP based network.

Figure 6:
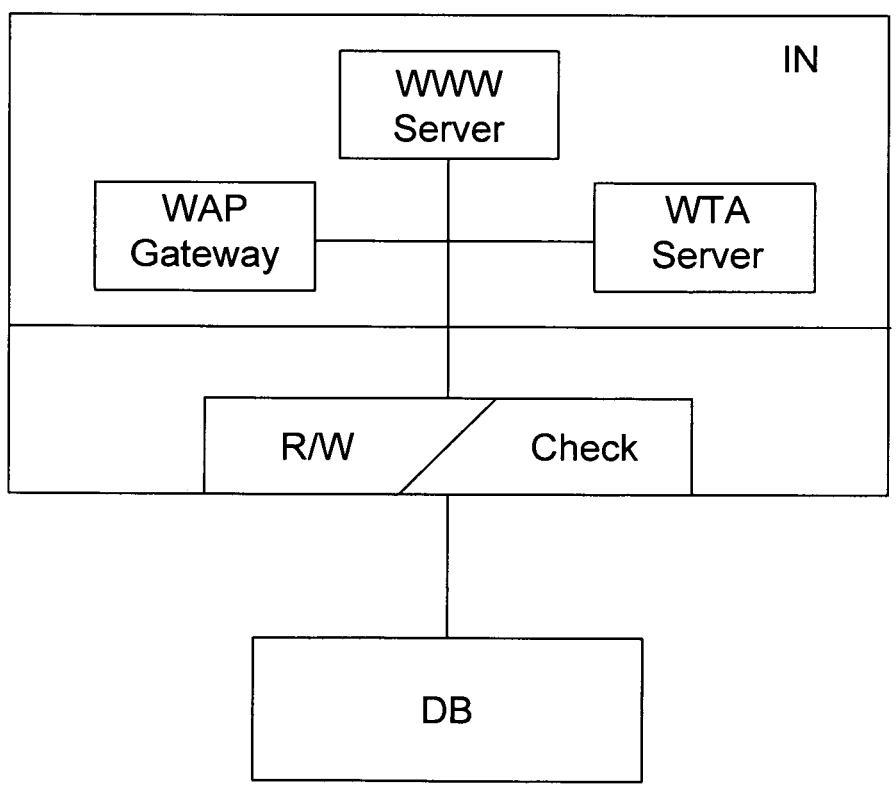
FIG. 6 illustrates portions of the intelligent network (IN) that perform specific functions, according to the invention.

The elements that make up of the intelligent network (IN) are illustrated in more detail in FIG. 6. As discussed above, the IN includes a WAP Gateway, a WTA Server and possibly a WWW Server, depending on the embodiment of the invention. The interface with the database DB includes read/write element to read data from the database and to cause data to be written to the database, as well as a checker to determine whether a match with a particular value has occurred.

It is obvious to a person skilled in the art that as technology advances, the inventive concept can be implemented in various ways. The invention and its embodiments are not limited to the examples described above, but they may vary within the scope of the claims.

The invention claimed is:

1. A method of processing a communication in a communications system, the method comprising:
    receiving a communication initiation from subscriber A, said communication initiation indicating that subscriber A wants to communicate with subscriber B such that subscriber B pays for the communication,
    transmitting, in response to the communication initiation, an enquiry about whether subscriber B is willing to pay fro a communication from said subscriber A by means of network elements of the communications system, said enquiry being transmitted to the B subscriber by using a Wireless Application Protocol (WAP) Push message,
    transmitting a response to said enquiry from the B subscriber to an network element of the communication system, and
    if subscriber B is willing to pay for the communication according to the enquiry, connecting a communication between subscriber A and subscriber B automatically by the network elements of the communications system so that subscriber B is defined at the payer of the communication.

2. A method according to claim 1, wherein the method also comprises:
    defining a group of subscribers who have been selected in advance by subscriber B and the communications from whom subscriber B is willing to pay for,
    storing the identifiers describing said subscribers in a database, and
    transmitting, in response to subscriber A's communication initiation, an enquiry to the database about whether subscriber A from whom the communication initiation was received belongs to the group of subscribers stored in the database.

3. A communications system comprising at least:
    subscriber terminal A and subscriber terminal B, between which a communication can be set up,
    a mobile services switching centre for transmitting communications between the subscribers,
    means for receiving a communication initiation from subscriber terminal A, said communication initiation indicating that subscriber A wants to communicate with subscriber B such that subscriber B pays for the communication,
    means for informing subscriber terminal B that subscriber A wants to communicate with subscriber B such that subscriber B pays for the communication,
    a Wireless Telephony Application (WTA) server, and a WAP gateway for communicating with subscriber terminal B which is provided with WAP properties,
    a network element which subscriber B can inform of whether he wants to pay for a communication from certain subscriber A,
    means for transmitting an enquiry to said network element about whether subscriber B is willing to pay for a communication from said subscriber A, said network element being responsive to said enquiry for transmitting a charging enquiry to subscriber terminal B by using a WAP Push message about whether subscriber B is willing to pay for a communication from said subscriber A, and being arranged to receive subscriber B's response, and means for setting up a call so that subscriber B is defined as the payer of the communication if the result of the enquiry indicates that subscriber B is willing to pay the communication.

4. A system according to claim 3, wherein the network element also comprises:

a database, means for storing identifiers describing a group of subscribers defined by subscriber B in the database, the group consisting of subscribers the communications from whom subscriber B is willing to pay for, and means for checking whether subscriber A from whom the communication initiation was received belongs to the group of subscribers defined in the database.

5. A system according to claim 3, wherein the system also comprises:

means for defining said group of subscribers for the database by subscriber terminal B using the WAP technology.

6. A system according to claim 3, wherein the system comprises a www server, and means for defining said group of subscribers by a www server.

7. A system according to claim 3, wherein the system comprises means for informing subscriber A with another WAP Push message of whether subscriber B is willing to pay for a communication to be set up.

8. A system according to claim 3, wherein the system comprises means for transmitting information to subscriber A as a voice announcement on whether subscriber B is willing to pay for a communication to be set up.

* * * * *

UNITED STATES PATENT AND TRADEMARK OFFICE
CERTIFICATE OF CORRECTION

PATENT NO.        : 7,039,388 B2
APPLICATION NO. : 10/380826
DATED             : May 2, 2006
INVENTOR(S)       : Sami Pienmäki and IIkka Tiilikainen It is certified that error appears in the above-identified patent and that said Letters Patent is hereby corrected as shown below:

On Title Page, Item (75), the name of the second inventor should read as follows:

--ILKKA TIILIKAINEN--

Signed and Sealed this

Twenty-fourth Day of October, 2006

JON W. DUDAS
*Director of the United States Patent and Trademark Office*